May 3, 1938.　　　　A. KATZINGER　　　　2,116,490

CENTERING PAN SET

Filed Jan. 13, 1937

INVENTOR
Arthur Katzinger
BY Stanley Hoods
ATTORNEY

Patented May 3, 1938

2,116,490

UNITED STATES PATENT OFFICE 2,116,490

CENTERING PAN SET

Arthur Katzinger, Glencoe, Ill., assignor to The Edward Katzinger Company, Chicago, Ill., a corporation of Illinois Application January 13, 1937, Serial No. 120,402

3 Claims. (Cl. 220—97)

This invention relates to baking pan sets wherein a plurality of individual baking pans are located in spaced parallel positions and are secured together in such positions to form a set, and has for its object the provision of means, operable within the pans of a lower set when two or more pan sets are nested for stacking, for holding the nested or stacked pan sets against relative movement, both longitudinally and transversely of the sets, thereby maintaining the walls of the pans of the sets spaced one from the other and the nested pan sets in a perpendicular stack.

Figure 1:
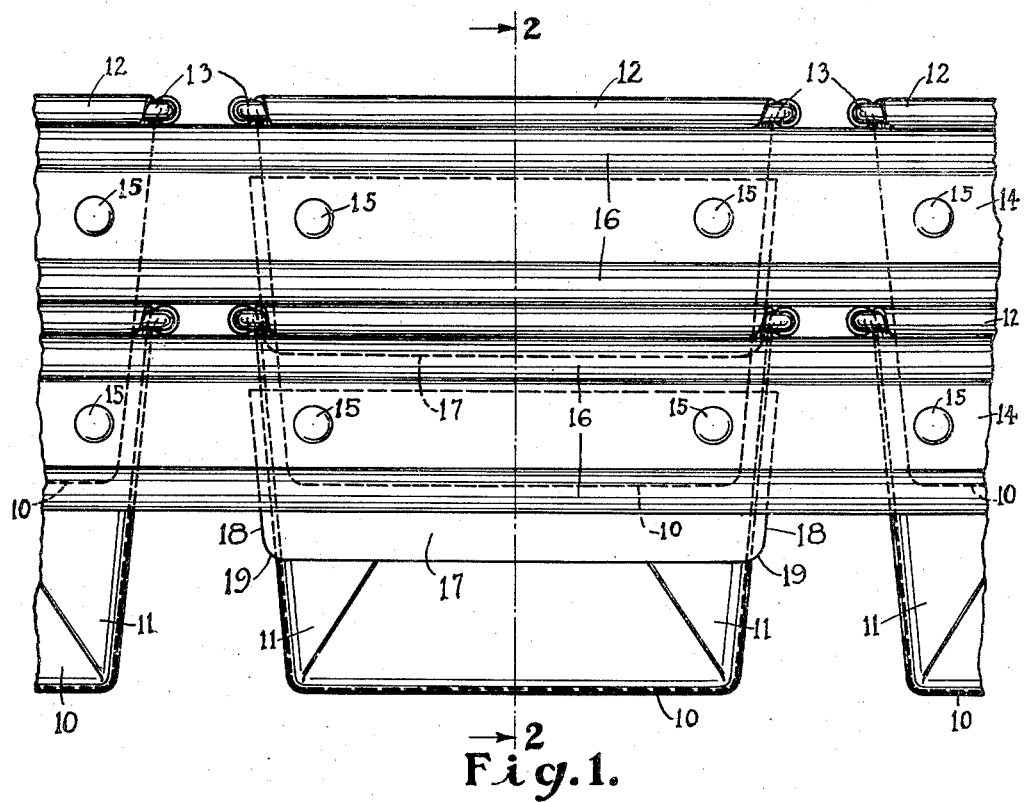
Figure 2:
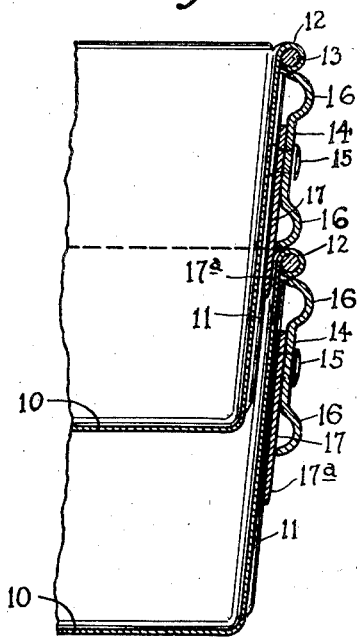

With the above and other objects in view, as will be apparent, this invention consists in the construction, combination and arrangement of parts, all as hereinafter more fully described, claimed and illustrated in the accompanying drawing, wherein:

Fig. 1 is a fragmentary side elevation of two pan sets constructed in accordance with the present invention illustrating one nested within the other; and Fig. 2 is a fragmentary, vertical section taken along line 2—2 of Fig. 1.

Baking pan sets or multiple unit baking pans, when not in use are customarily nested one within the other to create a perpendicular stack. When this occurs the pans of the several sets are so nested that the walls thereof are spaced one from the other to permit air circulation therebetween and unless prevented from so doing, the several pan sets in the stack can therefore, move relatively, one to the other, both longitudinally and transversely of the sets. This movement when it occurs results in the stack shifting out of perpendicular and also causes the inner surfaces of the pan walls to become rubbed causing an ultimate discoloration which in time will be transferred to the material baked within the several pans of the set.

The present invention contemplates a means whereby the nested or stacked pan sets will be centered one within the other and any relative movement between the pan sets of the stack will be prevented. This will maintain the spaced positions of the walls of the pans of the set, prevent rubbing on the inner surfaces of the pan walls, and insure a solid, substantial and perpendicular stack.

Reference being had more particularly to the drawing, 10 designates a series of baking pans of any suitable construction but here shown as folded pans having corner laps or folds resting flush against the end walls of each pan 11. Each pan 10 is also provided with outstanding beads 12 at the edges of its walls, formed by bending flanges at the edges of the walls of the pan outwardly, downwardly and inwardly about a rectangular wire frame. The pans 10 are shown as being secured together in a set by means of the strap 5 or straps 14 resting against the exposed walls of the pans 10 of the set and secured to said pans by means of the rivets 15 passing through the longitudinal center of the strap or straps 14 and piercing the corner laps 11 of the pans but it is manifest that any other means of incorporating in a set may be utilized. Along the upper and lower longitudinal edges of the strap or straps 14 are the outstanding beads 16, semi-circular in cross-section, the lower of which when one pan set is nested in another pan set, rests upon the outstanding beads 12 of the pans of the subjacent set.

The foregoing described construction forms no part of the present invention but is merely illustrative of a type of pan set construction to which centering features constituting the present invention may be applied.

At the rear of the strap 14 and between the outer faces of the corner laps or folds 11 and the inner surface of said strap, is a centering plate 17. This plate 17 is generally of greater length than the width of a pan 10 and its ends 18 are bevelled or convergent to conform to the flare of the side walls of the pan 10 and therefore, are substantially parallel to the planes of the respective side walls of the pan. A portion of the plate 17 extends below the lower bead 16 of the cooperating strap 14 so that when the lower bead 16 of the strap 14 of a pan set rests upon the beads 12 of the pans 10 of a subjacent pan set that portion of the plate 17 (designated as 17ª in Fig. 2) projecting below the lower bead 16 of the strap 14 of the uppermost pan set enters the corresponding or aligned pan 10 of the lower pan set adjacent to, and in the rear of the bead 12 of the end wall thereof. At least one plate 17 is provided on each longitudinal side of the pan set in alignment with the end walls of the pans 10.

Hence, if there is a tendency of the pan sets in a stack to move relatively longitudinally of the set, the ends 18 of the plate 17, contact with the corners of the subjacent pan adjacent the beads 12 thereof and prevent such movement.

If there is a tendency of the pan sets in the stack to move relatively transversely of the pan sets, those portions of the plates 17 projecting below the lower beads 16 of the straps 14 of the upper pan set contact with the inner surfaces of the end walls of the cooperating pan of the lower set and prevent such movement.

In order to facilitate the entry of the protruding edge portion 17ª of the plate 17 into a pan 10 of a lower or subjacent set, the exposed corners 19 thereof, between the lower longitudinal edge of the plate and the sloping or convergent ends 18 thereof, are rounded or curved.

From the foregoing, it is clear that one or more plates 17 upon each longitudinal side of a pan set and positioned in alignment with the end wall of one or more of the pans 10 of the said set, will prevent relative movement between two or more stacked pan sets either longitudinally or transversely of the sets, and that the walls of the pans 10 thereof, because of the deep nesting line created by the lower bead 16 of the strap 14, are spaced one from the other and are so maintained by the plates 17 contacting the inner faces of the walls of the pans 10 of the subjacent set upon any tendency toward relative movement between the pans of the set.

What is claimed:

1. The combination with a plurality of baking pans, of a strap resting against the exposed walls of said pans, means for securing the strap to said pans to combine them in a set, and a plate interposed between a pan wall and the strap and held in place by the means securing the strap to the pan, said plate being longer than the width of the adjacent portion of the pan wall and wider than the strap, and having its transverse ends lying in planes substantially parallel to the walls of the pan.

2. The combination with a pan set consisting of a plurality of pans arranged side by side and a strap on the opposite sides of the set resting against the end walls of the pans, of a plate interposed between each strap and the end wall of a pan of the set, said plate having extensions projecting laterally beyond the limits of said end walls and against which the walls of a subjacent pan may abut to prevent relative longitudinal movement of the sets when nested.

3. The combination with a pan set consisting of a plurality of pans arranged side by side and a strap on the opposite sides of the set resting against the end walls of the pans, of a plate interposed between each strap and the end wall of a pan of the set, said plate having extensions projecting laterally beyond the limits of said end walls and against which the walls of a subjacent pan may abut, the lower corners of said plate being rounded to facilitate entry thereof to the interior of a subjacent pan.

ARTHUR KATZINGER.